United States Patent Office 3,511,713
Patented May 12, 1970

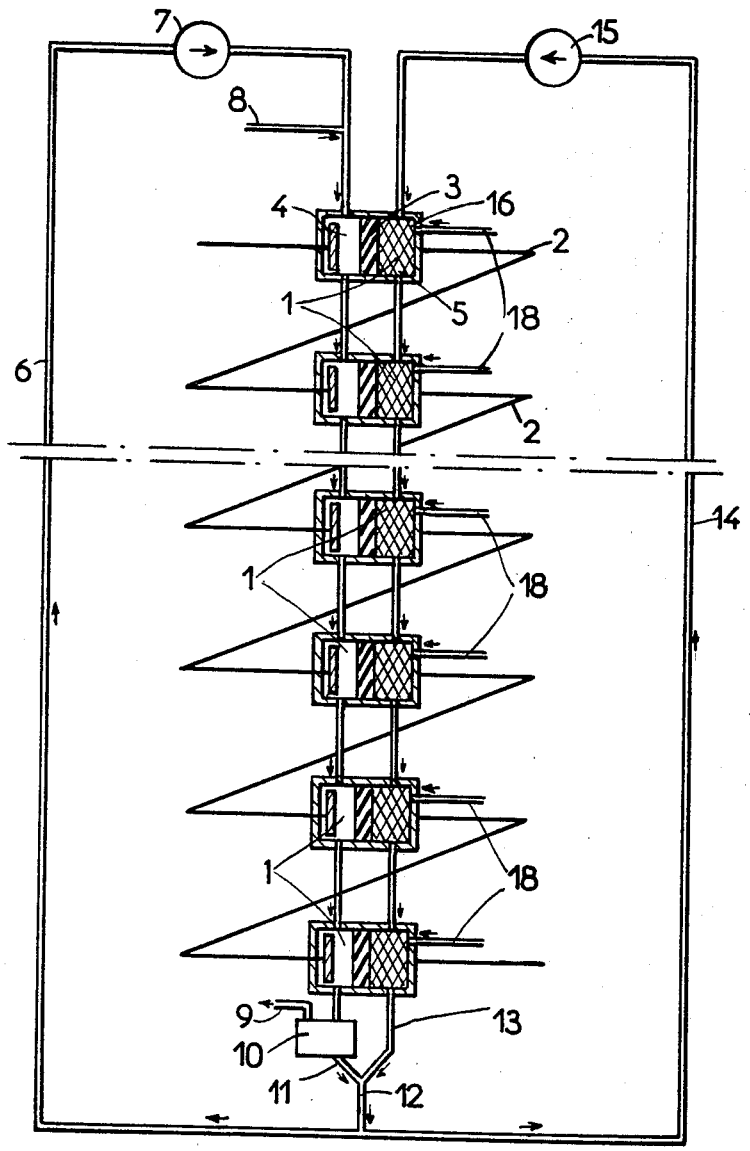

3,511,713
FUEL CELL WITH A BASIC ELECTROLYTE HAVING CONTINUOUS AUTOMATIC DECARBONIZATION, AND METHOD OF GENERATING ELECTRICITY THEREWITH
Bernard Warzawski, Paris, France, assignor to Societe Generale de Constructions Electriques et Mecaniques (Alsthom), Paris, France, a corporation of France
Filed Feb. 26, 1968, Ser. No. 708,033
Claims priority, application France, Feb. 24, 1967, 2,737
Int. Cl. H01m 27/26
U.S. Cl. 136—86
7 Claims

ABSTRACT OF THE DISCLOSURE

A fuel cell battery, subdivided into a number of individual unit-fuel cells, connected electrically, is arranged to have electrolyte passing, successively, through the cells. Each cell is subdivided by a semi-permeable membrane into two half-cells, each of about several tenths mm. to several millimeters wide to form anodic and cathodic half-cells. Electrolyte traverses these cells, parallel to the semi-permeable membrane. Electrolyte flow is regulated, for example by means of a pump, such that when the electrolyte passing the anodic half-cell attains a pH value at which carbonic gas is liberated, the electrolyte will be at the outlet of the cell; the carbonic gas is separated from the electrolyte, for example by decanting in a tank, and the remaining electrolyte is mixed with the electrolyte derived from the cathodic half-cell, and, after separation into respective portions, re-introduced into the cells of the battery for re-cycling.

---

The present invention relates to fuel cells, and more particularly to fuel cells utilizing a basic electrolyte, in a method providing for continuous, automatic decarbonization.

It is known that the problem posed by the carbonization of the basic electrolyte of a fuel cell is one of the most serious problems so far encountered in research directed to introduce fuel cells into industry.

In effect, in a fuel cell having industrial uses, i.e. consuming oxygen from the air and—directly or indirectly—a carbonaceous fuel, a certain amount of carbonic acid enters the cell from various sources: air contains a certain proportion of carbonic gas; the direct utilization of a carbonaceous fuel yields some carbonic acid as a reaction byproduct; the reforming of a carbonaceous fuel produced from hydrogen (which to be economical cannot be strongly purified) contains a notable proportion of carbonic anhydride.

This poses no problem if an acid medium is utilized, but then—as is known—the choice of material for the electrode is restricted: among the catalysts know to activate electrodes in this medium, only the platinoids have hitherto been considered suitable. The acid medium therefore leads to an expensive cell, and the manufacture of such a cell is moreover held back by the limited production of platinum.

In a basic medium, on the other hand, numerous inexpensive and readily available materials lend themselves to being utilized as electrodes or as catalysts, both insofar as the oxygen and as numerous fuels are concerned. Oxygen has a reversible reduction in perhydroxylic ion on numerous materials (silver, active carbon, etc.). Economical carbonaceous fuels like methanol react readily at ordinary temperatures on catalysts such as nickel boride. But the carbonic acid that is produced rapidly carbonizes the basic electrolyte and eventually transforms the electrolyte entirely into an acid solution of carbonate, which in most cells results in performance breakdown.

It is desirable to provide a fuel cell which permits continuous or intermittent decarbonization of the electrolyte. Many of the methods already investigated require more energy than the cell produces. Some of these methods call for auxiliary reagents, as well as supplementary apparatus. Of all these methods, the one that has been held to be the most satisfactory consists of adding, continuously or intermittently a base such as lime, which provokes the formation of an insoluble carbonate. However, aside from the need for convenient means both of injecting the lime and of filtering the calcium carbonate, this procedure necessitates storing lime as well as fuel in the proportion of 1.75 kg. of lime to 1 kg. of methanol, and requires complicated and bulky additional components.

Another method, proposed by Justi (see Journal of the Electrochemical Society, 1961, vol. 108, 11, 1073), consists of joining, to the cell proper, an electrolytic cell whose anodic and cathodic half-cells are separated by a cation-exchange membrane. When sufficient tension is applied between the two electrodes of this cell, the $K^+$ cations of the potassium carbonate solution extracted from the fuel cell and introduced into the electrolytic cell will pass through the membrane under the influence of the electric field, while at the anode oxygen and carbonic gas will be liberated, and at the cathode hydrogen will be liberated. Thus in this manner it is possible to use electrodialysis to transform the potassium carbonate solution into potassium; however, in addition to the energy needed for this transformation there is the energy needed for the electrolysis of the water. This supplementary expenditure of energy must be avoided either by consuming the hydrogen and the oxygen thus produced in an auxiliary fuel cell or by utilizing two identical reversible electrodes and periodically inverting their role. In any case, the procedure involves losses due to the overstressings of the electrodes and to the ohmic drop in the electrodialytic cell, and it may involve analogous losses in the auxiliary cell. Furthermore, the electrodialytic cell and possibly the auxiliary cell constitute distinct supplementary components of the cell proper.

Of all the methods hitherto considered or applied experimentally, not one is truly satisfactory. In spite of all the advantages there would be in staying with a basic medium, the absence of a ready method of decarbonization is forcing a great number of research teams to reorient themselves, either in the direction of fuel cells with an acid electrolyte, where the problem of platinoid replacement is serious; or in the direction of neutral mediums, which however have low performance at present; or in the direction of indirect hydrogen fuel cells, which however necessitate the purification of the hydrogen given off by the reforming of a carbonaceous fuel.

It is an object of the present invention to provide a fuel cell with a basic electrolyte that can automatically eliminate carbonic acid from the system no matter what its source, without any special energy consumption aside from that given off by the normal polarizations of the cell, and without any additional components, thus retaining the advantages of the alkaline medium.

The present invention is based on the fact that, in a fuel cell divided into two half-cells by a semi-permeable membrane, the development of electrochemical reactions at the electrodes causes the resulting two electrolytic solutions to become dissimilar with respect to each other.

If, for example, a fuel cell consuming hydrogen and oxygen is considered, the reduction of the oxygen produces $OH^-$ ions at the rate of one ion per exchanged electron, and the oxidation of the hydrogen consumes $OH^-$ ions at the rate of one ion per exchanged electron. The presence of the membrane prevents the passage of $OH^-$ ions from one half-cell to the other by convection; this passage is practically impossible except by migration under the effect of the electric field (diffusion under the influence of the concentration gradient being generally more or less negligible). But if a non-anionic semi-permeable membrane is chosen (i.e. one that is either cationic or non-selective) the transport number of the OH⁻ ions across the membrane is less than 1 because of the competition of the other ionic species. There is thus no compensation, and in proportion as the reactions continue the electrolyte of the cationic half-cell becomes increasingly more basic and the electrolyte of the anodic half-cell becomes correspondingly less basic. If, instead of pure hydrogen, hydrogen containing carbonic gas yielded by reforming is used, or if a carbonaceous fuel such as methanol is utilized, the supplementary consumption of OH⁻ ions by the present or produced carbonic acid depletes the electrolyte of the anodic half-cell even more rapidly than in the case of pure hydrogen. If this trend to dissimilarity, which may be termed heterogenization, is further increased, the base norm of the solution in the cathodic half-cell will increase, which will not perceptibly change the pH, nor will it perceptibly modify the reduction conditions of the oxygen: the latter will remain as favorable as ever. On the other hand, the pH of the solution in the anodic half-cell will diminish, and it is possible to allow this diminution to be pushed to the point at which carbonic gas begins to be liberated, i.e. in practice, with electrolytic solutions of medium concentration, up to a pH of the order of 10 to 9. Although the functioning of an electrode using oxygen at this pH would be generally very poor, it is well known that the functioning of an electrode using a fuel such as methanol is practically the same as pH 14–15, as has been shown by numerous investigations. As for the stability of a catalyst such as nickel boride, it is even greater in this medium that borders on neutrality than in a medium of concentrated potassium.

Subject matter of the present invention.—Briefly, the cell is divided by a semi-permeable membrane into two thin half-cells, an anodic half-cell and a cathodic half-cell; each half-cell is only from several tenths of a millimeter to several millimeters wide. These half-cells are traversed by an electrolyte circulating parallel to the semi-permeable membrane. The membrane is anionic, that is, the flow of electrolytes is regulated according to the current required from the cell in such a manner that the solution crossing the anodic half-cell may reach a pH at which carbonic gas is liberated in gaseous form. The gaseous carbonic gas thus liberated is effectively separated from the electrolyte at the outlet of the anodic half-cell, by decanting, for example. After this separation, the two electrolytes are mixed and then re-separated into two like parts and reintroduced into the cell in such a way as to recommence the cycle.

The low amplitude of motion of the electrolytes, due to the natural convection inside the electrolytic half-cells prevents any recombination of the electrolyte from one point to another in an electrolytic half-cell.

If the semi-permeable membrane is non-selective, it is advantageous for the electrolyte to contain, in addition to the base, a substantial concentration of neutral salt, such as a salt of the base in question and of a non-electroactive anionic acid.

The battery is preferably split up into at least as many distinct unit-cells as there are homogeneous fields of pH crossed successively by the anodic electrolyte, in such a manner that the partial unit-cell corresponds to a homogeneous field in which the pH of the anodic electrolyte exhibits only moderate variations.

The cell functioning in accordance with the foregoing characteristics will, at each cycle, eliminate a quantity of carbonic gas equal to that which will have been introduced in some form in the course of the cycle. Liberation of this quantity of gas is assured by subjecting the flow of electrolytes to the required electric current or to the pH of the solution at the outlet of the anodic half-cell. At normal equilibrium, the electrolyte after re-homogenization will be a solution containing the initial base, some neutral carbonate of this base, and possibly the above-mentioned neutral salt.

The addition of a neutral salt in the case in which the membrane is non-selective is intended to keep the OH⁻ transport number as constant as possible. In effect, without this addition, the transport number of the OH⁻ ions in relation to the K⁺ or Na⁺ ions would tend to increase in proportion to the progression of the electrolytes due to split-up of the components. The addition of a neutral salt in a notable concentration, several times that of the base for example, tends to keep the transport number of the OH⁻ ions perceptibly constant during the whole crossing, which avoids the necessity of needlessly increasing the effect of the partial cell or partial cells of low pH with respect to those of high pH.

The fact of splitting up the cell into several partial cells is justified by the necessity of avoiding the situation where a single cell is made to function under unfavorable energy conditions. In effect, if the evolution of the anodic electrolyte is considered, it will be seen that there are at least two regions with different pH, one with pH 14–15, buffered by the base, the other with pH 10–9, buffered by the buffer carbonate (neutral or carbonate acidic). There could even be, if desired, a third region with pH 7–6 buffered by a carbonate acid-$CO_2$ buffer. If all this evolution occurred on a single and thus equipotential electrode, it would be necessary to place this electrode in conditions compatible with the least favored portion, i.e. that which has the lowest pH, which amounts to saying that it would be necessary to impose onthe cell as a whole a potential difference much weaker than that which could be obtained in the most basic region. Since such functioning is obviously uninteresting to obtain the best result from the point of view of energy yield, it is therefore advisable to effectively split up the advancement of the electrolytes into two parts, even possibly in three parts, and to make each part work in a separate cell, functioning in a homogeneous pH region, i.e. around one of the indicated buffers.

Furthermore, the division into several partial cells requires that in all load conditions the relationship of each partial current to the total current should remain constant. This last requirement can be met in various ways. The smallest denominator of all the fractions of the current to be produced in the different homogeneous pH fields that are successively crossed by the anodic electrolyte should preferably be sought. The total cell will be divided into a number of elementary cells equal to this smallest common denominator, and all these cells will be placed in an electrical series. The required condition will thus be automatically observed.

The attached single figure illustrates, schematically, a methanol-air cell in which the advancement of the anodic electrolyte in the cell is divided into three homogeneous pH regions, the first embracing three-quarters of the overall current, the second one-eighth of the overall current, and the third likewise one-eighth of the overall current.

Referring now to the drawing, the overall cell has thus been split up into eight elementary or unit-cells 1 placed electrically in series by electrical connections schematically represented at 2. To reduce the length of the drawing, only four out of the six first elementary cells are shown. These elementary cells are each divided by a semi-permeable membrane 3 into two thin half-cells, each only several millimeters wide, namely an anodic half-cell 4 and a cathodic half-cell 5. The anodic electrolyte enters by a pipe 6, pumped by a pump 7, and receives at 8 an injection of methanol coming from a reservoir above (not shown in the drawing). It then flows through the anodic half-cell 4 of each of the eight elementary cells 1 successively. At the outlet of the assembly of these cells, the electrolyte is decanted in a tank 10, and carbonic gas taken taken off at 9. The anodic electrolyte then enters the conduit 11, and is mixed in the conduit 12 with the electrolyte flowing out of the conduit 13 from the cathodic half-cells 5. From conduit 12, a portion of the dectrolyte enters pipe flow 6 and another portion enters a pipe flow 14, which feeds, after being pumped by pump 15, successive cathodic half-cell 5 of each of the eight elementary cells 1.

Each cathodic half-cell of these cells 1 contains a mesh electrode 16 which can receive air for direct mixing, or emulsifying with the electrolyte as more fully described in the copending application Ser. No. 708,224 filed Feb. 26, 1968 and assigned to the assignee of the present invention [French Serial PV. 2735, Feb. 24, 1967]. The air to be mixed or emulsified is obtained from compressors, not shown in the drawing, and enters by way of conduits 18 into the cathodic half-cells 5.

The electrolytic flow can be regulated by means of pumps 7 and 15; or regulated (by any known device, not shown) in dependence on the pH of the electrolytic solution at the oulet of the anodic half-cell 4 flowing into the tank 10; or it can be controlled by the electric current derived from the cell.

The method of decarbonization according to the present invention uses the electrolyte in a closed cycle; but the desired transformation of the electrolyte is assured by the cell's normal electrochemical processes themselves. There is thus, in relation to the oxidation energy of the fuel until the $CO_2$ stage, no energy loss other than the cell's normal polarization. Nor are any requirements for supplementary or accessory components, or devices for the cells themselves.

In a typical electrolyte using an aqueous solution of soda, a suitable neutral salt is sodium chloride, concentration of which is in the order of soda concentration.

I claim:

1. A fuel cell utilizing a basic electrolyte and continuous automatic decarbonization, and having electrolyte inlets and outlets, comprising
    a semi-permeable membrane located to separate said call into two half-cells to form an anodic and a cathodic half-cell, said half-cells each having a width of from several tenths of a millimeter to several millimeters;
    means applying said electrolyte to each of said half-cells and circulating said electrolyte parallel to the semi-permeable membrane, said membrane being non-anionic;
    means regulating electrolyte flow in such a manner that the electrolyte once having passed the anodic half-cell attains the value of pH at which carbonic gas is liberated in gaseous form;
    means located at the outlet of said anodic half-cell separating the gaseous carbonic gas from the electrolyte;
    means mixing, after said separation, the electrolytes with the electrolyte from the cathodic half-cell;
    and means separating said mixed electrolytes into two portions and reintroducing said portions into the half-cells to recommence the cycle.

2. A fuel cell in accordance with claim 1, wherein the membrane is non-selective, and the electrolyte contains in addition to a base, a notable concentration of a neutral salt such as a salt of said base and a non-electroactive anionic acid.

3. A fuel cell in accordance with claim 1, wherein said separating means includes decanting means.

4. A fuel cell in accordance with claim 1, wherein said regulating means includes adjustable flow pumps.

5. A fuel cell battery comprising a plurality of cells each in accordance with claim 1, the number of said cells corresponding to the number of said cells being in electrolyte fluid communication, and homogeneous pH fields traversed successively by the anodic electrolyte.

6. A fuel cell battery in accordance with claim 4, wherein said cells are connected together in an electrical series circuit, the number of cells being equal to the smallest common denominator of the fractions of the current to be produced in the different homogeneous pH fields successively traversed by the anodic electrolyte.

7. Method of generating electricity by means of a fuel cell, said fuel cell being subdivided into an anodic and a cathodic half-cell, separated by a semi-permeable membrane, said method comprising
    introducing a basic electrolyte into each said half-cells;
    circulating said electrolyte parallel to the semi-permeable membrane; regulating electrolyte flow such that the electrolyte passing the anodic half-cell attains, at the outlet thereof, a pH value at which carbonic gas is liberated in gaseous form;
    separating said carbonic gas from the electrolyte derived from the anodic half-cell;
    mixing said electrolyte, after said separation, with the electrolyte derived from the cathodic half-cell;
    and reintroducing said electrolyte into each said half-cells to provide for a closed cycle of electrolyte flow.

References Cited

UNITED STATES PATENTS

| | | | |
|---|---|---|---|
| 3,436,271 | 4/1969 | Cole et al. | 136—86 |
| 3,322,574 | 5/1967 | Justi et al. | 136—86 |
| 3,338,747 | 8/1967 | Plust et al. | 136—86 |

FOREIGN PATENTS

| | | |
|---|---|---|
| 1,379,800 | 10/1964 | France. |

ALLEN B. CURTIS, Primary Examiner